United States Patent
Zavitz (12)

(10) Patent No.: US 10,577,819 B2
(45) Date of Patent: Mar. 3, 2020

(54) METHOD AND APPARATUS FOR ERECTING TOWER WITH HYDRAULIC CYLINDERS

(71) Applicant: Tindall Corporation, Spartanburg, SC (US)

(72) Inventor: Bryant A. Zavitz, Dunwoody, GA (US)

(73) Assignee: Tindall Corporation, Spartanburg, SC (US)

( * ) Notice: Subject to any disclaimer, the term of this patent is extended or adjusted under 35 U.S.C. 154(b) by 3 days.

(21) Appl. No.: 15/419,039

(22) Filed: Jan. 30, 2017

(65) Prior Publication Data

US 2017/0138081 A1    May 18, 2017

Related U.S. Application Data

(63) Continuation of application No. 14/317,343, filed on Jun. 27, 2014, now Pat. No. 9,556,636.

(51) Int. Cl.
| | |
|---|---|
| *E04H 12/00* | (2006.01) |
| *E04H 12/34* | (2006.01) |
| *F03D 13/20* | (2016.01) |
| *E04H 12/18* | (2006.01) |
| *F03D 80/70* | (2016.01) |
| *E04H 12/20* | (2006.01) |

(52) U.S. Cl.
CPC ........... *E04H 12/344* (2013.01); *E04H 12/18* (2013.01); *E04H 12/20* (2013.01); *E04H 12/34* (2013.01); *F03D 13/22* (2016.05); *F03D 80/70* (2016.05); *F05B 2230/61* (2013.01); *Y02E 10/728* (2013.01)

(58) Field of Classification Search
CPC ....... B66C 23/348; E04H 12/10; E04H 12/18; E04H 12/344; E21B 7/02; E02D 27/42; F03D 11/045
See application file for complete search history.

(56) References Cited

U.S. PATENT DOCUMENTS

| | | | |
|---|---|---|---|
| 2,221,067 A | 11/1940 | Hart | |
| 2,794,242 A | 6/1957 | Evers | |
| 3,211,427 A | 10/1965 | Bristow | |
| 3,239,990 A | 3/1966 | Adler | |
| 3,266,211 A | 8/1966 | Hughes | |
| 3,302,345 A | 2/1967 | Ballantine | |
| 3,416,284 A | 12/1968 | Adler | |

(Continued)

FOREIGN PATENT DOCUMENTS

| | | |
|---|---|---|
| DE | 10111280 | 6/2002 |
| EP | 2712985 | 4/2014 |

(Continued)

OTHER PUBLICATIONS

European Search Report, dated Oct. 23, 2017, in connection with International Application No. Pct/US2015037967.
PCT Search Report and Written Opinion.

*Primary Examiner* — Gisele D Ford
(74) *Attorney, Agent, or Firm* — Meunier Carlin & Curfman LLC

(57) ABSTRACT

A method and apparatus for constructing a tower, where the apparatus may include a structure including a foundation including a plurality of hydraulic cylinders; a truss tower located on the foundation and configured to support a tower built on the foundation; and a controller configured to control extension and retraction of the hydraulic cylinders.

10 Claims, 9 Drawing Sheets

(56) References Cited

U.S. PATENT DOCUMENTS

| | | |
|---|---|---|
| 3,464,169 A | 9/1969 | Faustin |
| 3,673,754 A | 7/1972 | Murashige |
| 3,828,513 A | 8/1974 | Vanderklaauw |
| 3,984,962 A | 10/1976 | Krohn |
| 4,021,978 A | 5/1977 | Busse |
| 4,327,534 A | 5/1982 | Mastalski |
| 4,393,630 A | 7/1983 | Knox |
| 5,509,502 A | 4/1996 | Beaulieu |
| 5,794,387 A | 8/1998 | Crookham |
| 6,655,097 B1 | 12/2003 | Poolaw |
| 7,290,672 B2 | 11/2007 | Davis |
| 7,576,705 B2 | 8/2009 | Greenfield |
| 8,353,132 B1 | 1/2013 | Vogt |
| 8,578,679 B1 | 11/2013 | Petricio Yaksic |
| 8,863,474 B2 | 10/2014 | Yuan |
| 8,925,257 B2 | 1/2015 | Petrello |
| 8,935,901 B2 | 1/2015 | Petrello |
| 9,016,004 B2 | 4/2015 | Vogt |
| 9,097,033 B2 | 8/2015 | Margevicius |
| 2002/0112441 A1 | 8/2002 | Bissen |
| 2003/0115810 A1 | 6/2003 | Reinert, Sr. |
| 2004/0226258 A1 | 11/2004 | Zingerman |
| 2005/0260040 A1 | 11/2005 | Ingle |
| 2006/0042181 A1 | 3/2006 | Foo |
| 2009/0087311 A1 | 4/2009 | Wyborn |
| 2009/0126313 A1 | 5/2009 | Jolly |
| 2009/0188677 A1 | 7/2009 | Ditta |
| 2009/0217852 A1 | 9/2009 | Zaman |
| 2010/0005731 A1 | 1/2010 | Marvin |
| 2010/0031589 A1 | 2/2010 | Fernald |
| 2010/0199487 A1 | 8/2010 | Suh |
| 2010/0257794 A1 | 10/2010 | Stark |
| 2010/0281818 A1 | 11/2010 | Southworth |
| 2010/0326734 A1 | 12/2010 | Wasterval |
| 2011/0114386 A1 | 5/2011 | Souchek |
| 2011/0120043 A1 | 5/2011 | Vogt |
| 2011/0239584 A1 | 10/2011 | Tuong |
| 2012/0023859 A1 | 2/2012 | Johnson |
| 2012/0107055 A1 | 5/2012 | Baumfalk |
| 2012/0255478 A1 | 10/2012 | Hadeler |
| 2012/0304553 A1 | 12/2012 | Konduc |
| 2012/0304588 A1 | 12/2012 | Von Ahn |
| 2013/0019792 A1 | 1/2013 | Jahnig |
| 2013/0081337 A1 | 4/2013 | Zavitz |
| 2013/0227897 A1 | 9/2013 | Palmer |
| 2013/0269268 A1 | 10/2013 | Thiessen |
| 2013/0283726 A1 | 10/2013 | Chaput |
| 2014/0090333 A1 | 4/2014 | Vogt |
| 2014/0259985 A1 | 9/2014 | Petrello |
| 2014/0260076 A1 | 9/2014 | Yustus |
| 2014/0262518 A1 | 9/2014 | Reddy |
| 2014/0264215 A1 | 9/2014 | Yustus |

FOREIGN PATENT DOCUMENTS

| | | |
|---|---|---|
| GB | 597687 | 2/1948 |
| JP | 07102793 | 4/1995 |
| JP | 2001254668 | 9/2001 |

METHOD AND APPARATUS FOR ERECTING TOWER WITH HYDRAULIC CYLINDERS

CROSS REFERENCE TO RELATED APPLICATIONS

This application claims priority to and is a continuation of U.S. patent application Ser. No. 14/317,343, filed Jun. 27, 2014. This application is incorporated by reference herein in its entirety.

FIELD OF THE INVENTION

The present subject matter relates generally to tower structures, and more specifically to methods and apparatus for assembling tower structures.

BACKGROUND OF THE INVENTION

Construction of towers for support of various items has been practiced for many years. Various towers of various materials, including wooden, steel, and, more recently, concrete, have been provided to support, for example, electrical transmission lines. In a like manner, wind driven apparatus including windmills and wind-driven power generators in various forms and designed for many purposes (including for example pumping of water from wells as well as, more recently, generation of electrical power) have also been developed.

Such towers are generally constructed of multiple pieces that are assembled at the location of the tower. The pieces are usually hoisted in place by a crane. Cranes can be very expensive to maintain and operate, and a substantial hourly cost is incurred for every hour the crane is on site.

For example, a large construction crane may require 16 truckloads to transport all of the component parts, substantial labor to assemble and inspect, and then substantial labor to disassemble. Accordingly, a method and apparatus for constructing a tower that minimizes or eliminates the need for a crane is desired.

SUMMARY OF THE INVENTION

The present invention broadly comprises a method and apparatus for constructing a tower. In one embodiment, the apparatus may include a structure including a foundation including a plurality of hydraulic cylinders; a truss tower located on the foundation and configured to support a tower built on the foundation; and a controller configured to control extension and retraction of the hydraulic cylinders.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PREFERRED EMBODIMENTS

Reference is presently made in detail to exemplary embodiments of the present subject matter, one or more examples of which are illustrated in or represented by the drawings. Each example is provided by way of explanation of the present subject matter, not limitation of the present subject matter. In fact, it will be apparent to those skilled in the art that various modifications and variations can be made in the present subject matter without departing from the scope or spirit of the present subject matter. For instance, features illustrated or described as part of one embodiment can be used with another embodiment to yield a still further embodiment. Thus, it is intended that the present subject matter covers such modifications and variations as come within the scope of the disclosure and equivalents thereof.

Figure 1:
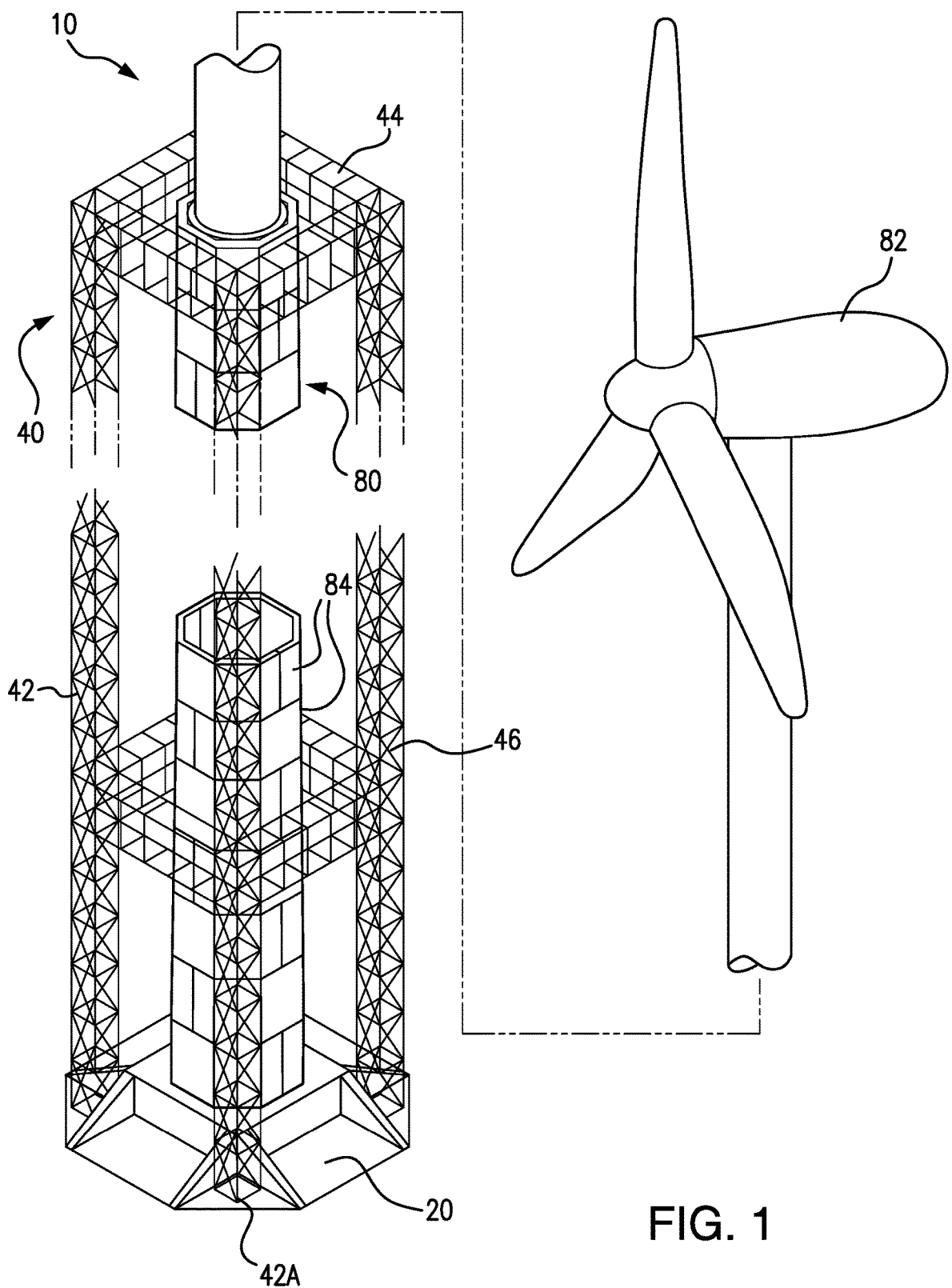
FIG. 1 illustrates a perspective view of an embodiment of the present invention.

FIG. 1 shows a perspective view of an exemplary embodiment of an apparatus 10 for constructing a tower 80 in accordance with the present invention. Tower 80 supports wind turbine 82, but towers made according to the present invention may support other equipment, power lines, or other objects. Any such towers may be constructed according to the present invention.

Figure 2:
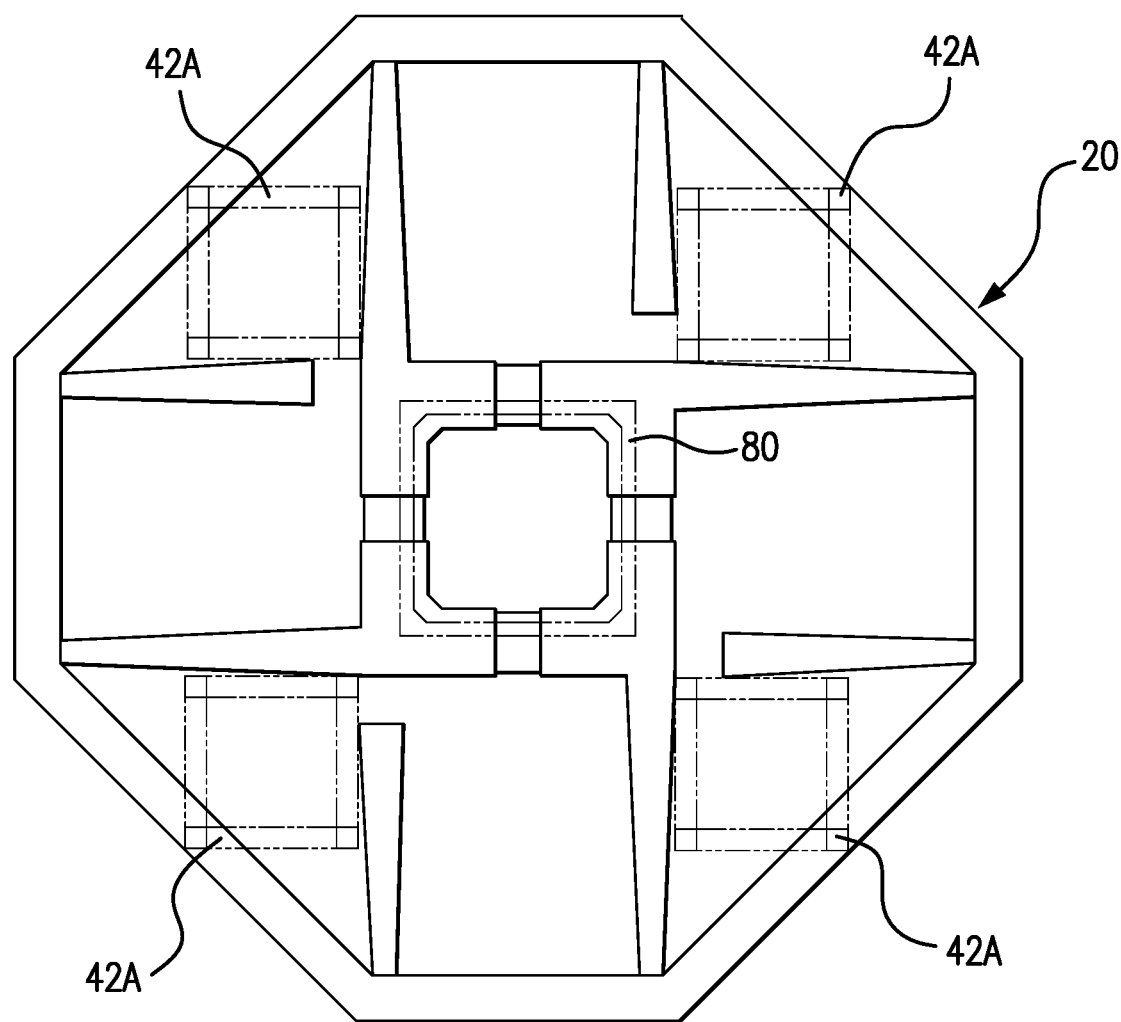
FIG. 2 is a top view of the foundation of the embodiment shown in FIG. 1.

Apparatus 10 includes a foundation 20 and a truss tower 40 located on the foundation 20. Foundation 20 includes a plurality of hydraulic cylinders 22, shown in FIGS. 3-8. Truss tower includes vertical legs 42, upper restraining truss 44, and lower restraining truss 46. As shown in FIG. 2, the base 42A of each vertical leg 42 of the truss tower 40 rests on foundation 20.

FIG. 1 shows a truss tower including two restraining trusses, but more than two can be included and are within the scope of the present invention. The restraining trusses 44 and 46 provide horizontal force to support the tower 80 during construction of the tower. In particular, the restraining trusses 44 and 46 counteract uneven forces on the tower 80 during the method of construction described hereafter.

Figure 9:
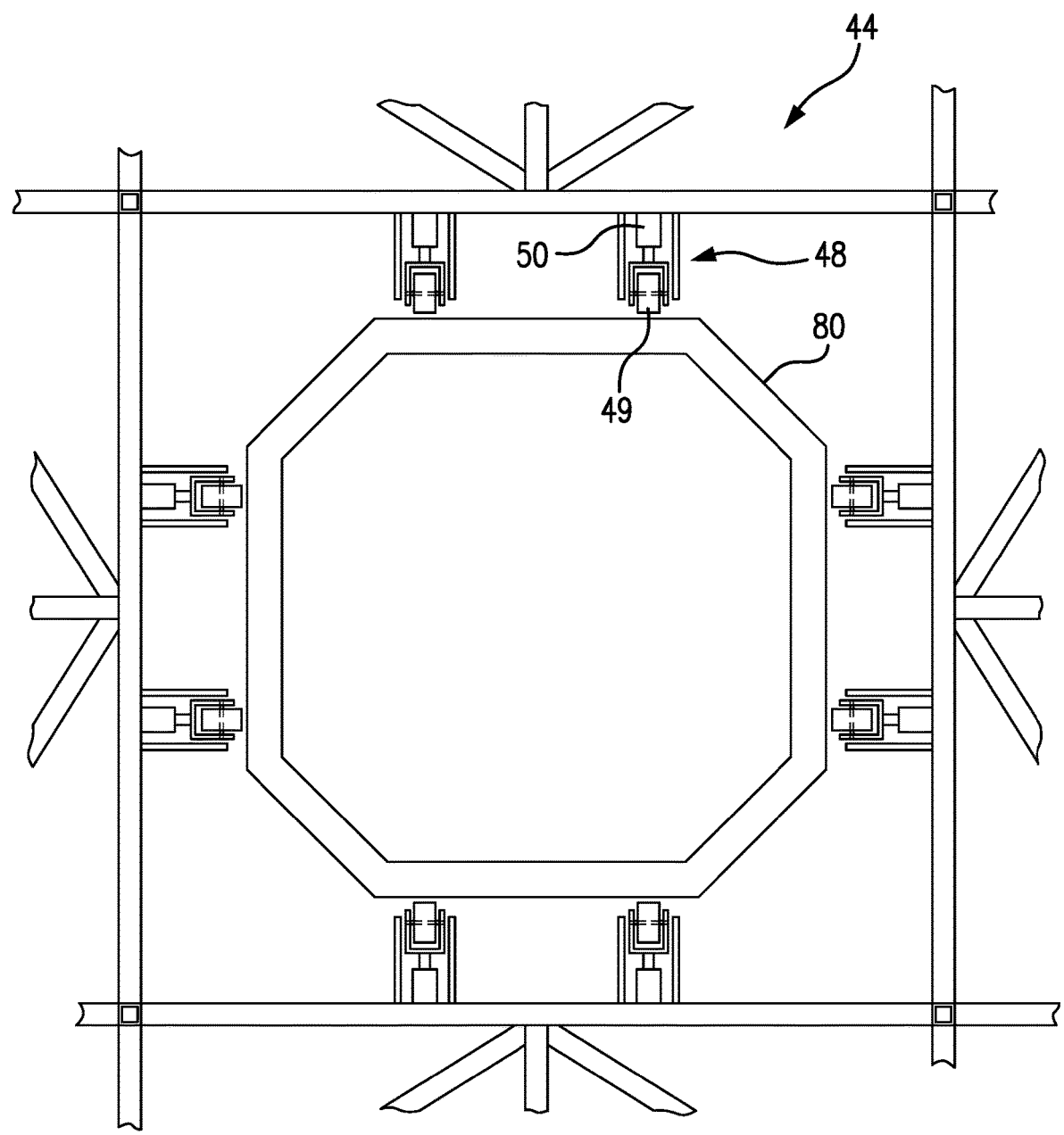
FIG. 9 is a top view of an embodiment of the restraining truss shown in FIG. 1.

FIG. 9 shows a close up top view of a restraining truss, such as upper restraining truss 44. Each restraining truss includes force bearing devices 48 to transfer force from the truss tower 40 to the tower 80. Further, the force bearing devices 48 allow tower 80 to move past vertically as additional levels are added to tower 80 from below. In the embodiment shown in FIG. 9, the force bearing device includes rollers 49 to exert horizontal force on tower 80 while still allowing tower 80 to move vertically. However, other devices known in the art may be used in this manner. Further, the force bearing devices may include hydraulic cylinders 50 to tighten the force bearing device up to the wall of tower 80. The embodiment shown in FIG. 9 includes a hydraulic cylinder 50 for each force bearing device 48. However, fewer may be used as long as the restraining truss can be sufficiently tightened around tower 80.

In the embodiment shown in FIGS. 1-9, tower 80 has an octagonal cross-section. However, other cross-section shapes are possible, such as square or circular cross-sections. All of these modifications are within the scope of the invention.

Tower 80 as shown in FIG. 1 includes a wind turbine 82 located on top of levels 84. In one embodiment, levels 84 are first constructed with a crane, the truss tower 40 is constructed around the levels 84, and then the crane lifts the wind turbine 82 to the top of levels 84. The following procedure is then used to add additional levels to the tower using hydraulic cylinders 22. However, if a heavy object like a wind turbine is not going to be located at the top of the tower, then the truss tower 40 can be constructed over foundation 20 and all levels can be constructed using the hydraulic cylinders 22. This would allow the elimination of the need for a crane, as the addition of levels using the hydraulic cylinders 22 only needs a forklift, as discussed hereafter.

In an embodiment for a tower 80 with a wind turbine 82, 10 2 m levels 82 may be constructed using a crane, and a height of wind turbine 82 may be 50 m. Thus, each leg 42 would be 20 m tall, upper restraining truss 44 would be at 20 m in height while lower restraining truss 46 may be at approximately 8 m from the bottom of truss legs 42. Truss legs 42 may be square of 12 inches on a side, and may be 22 feet apart from each other.

In the embodiment shown in FIG. 1, foundation 20 is constructed, and hydraulic cylinders 22 and block supports 24 are installed in the foundation 20. Hydraulic cylinders 22 are arranged in pairs, with a block support 24 extending between each pair of cylinders. A plurality of levels 84 are constructed using a crane, the truss tower 40 is constructed around levels 82 and on foundation 20, and the wind turbine 82 is added to the top of levels 84. Additional levels are then added using hydraulic cylinders 22 and block supports 24 as shown in FIGS. 4-8. In the embodiment shown in FIGS. 1-9, hydraulic cylinders 22 and block supports 24 are then removed from foundation 20 after the desired number of additional levels are added.

In the embodiment shown in FIGS. 1-9, there are 24 hydraulic cylinders 22. In one embodiment, cylinders 22 are sized to lift a concrete tower with a final weight of 1800 tons. However, towers of any dimensions and material may be constructed using this method and apparatus. The size and number of cylinders may vary depending on the dimensions of the tower and the building material. All of these modifications are within the scope of the present invention.

Figure 3:
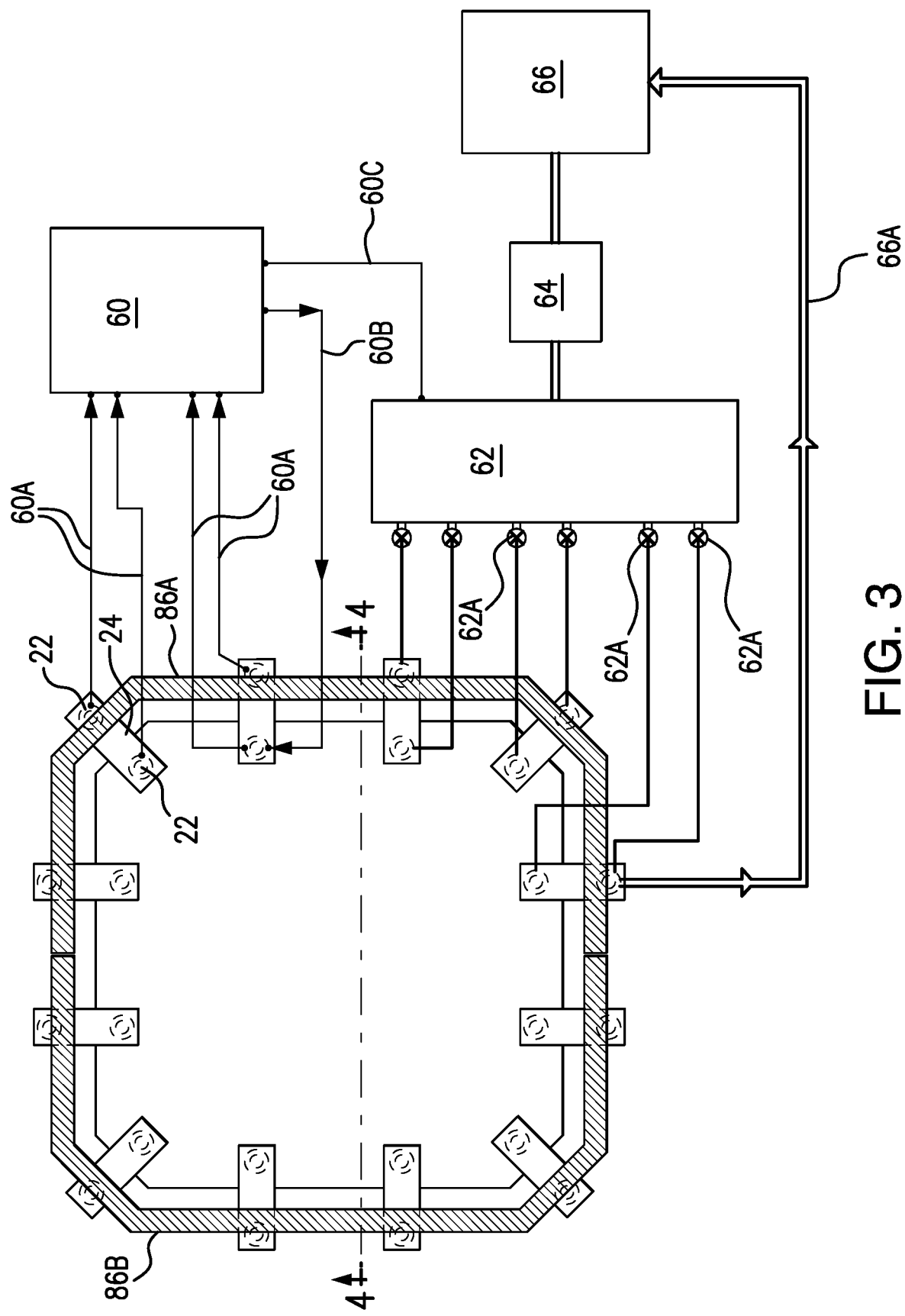
FIG. 3 illustrates a top view of the tower and a schematic of the cylinder control system.

In this regard, in the embodiment shown in FIGS. 1-9, each level 84 and 86 is slightly wider than the level above, as shown in FIG. 3. When the final level is added, the bottom of this final level will line up with the top of foundation 20.

Figure 4:
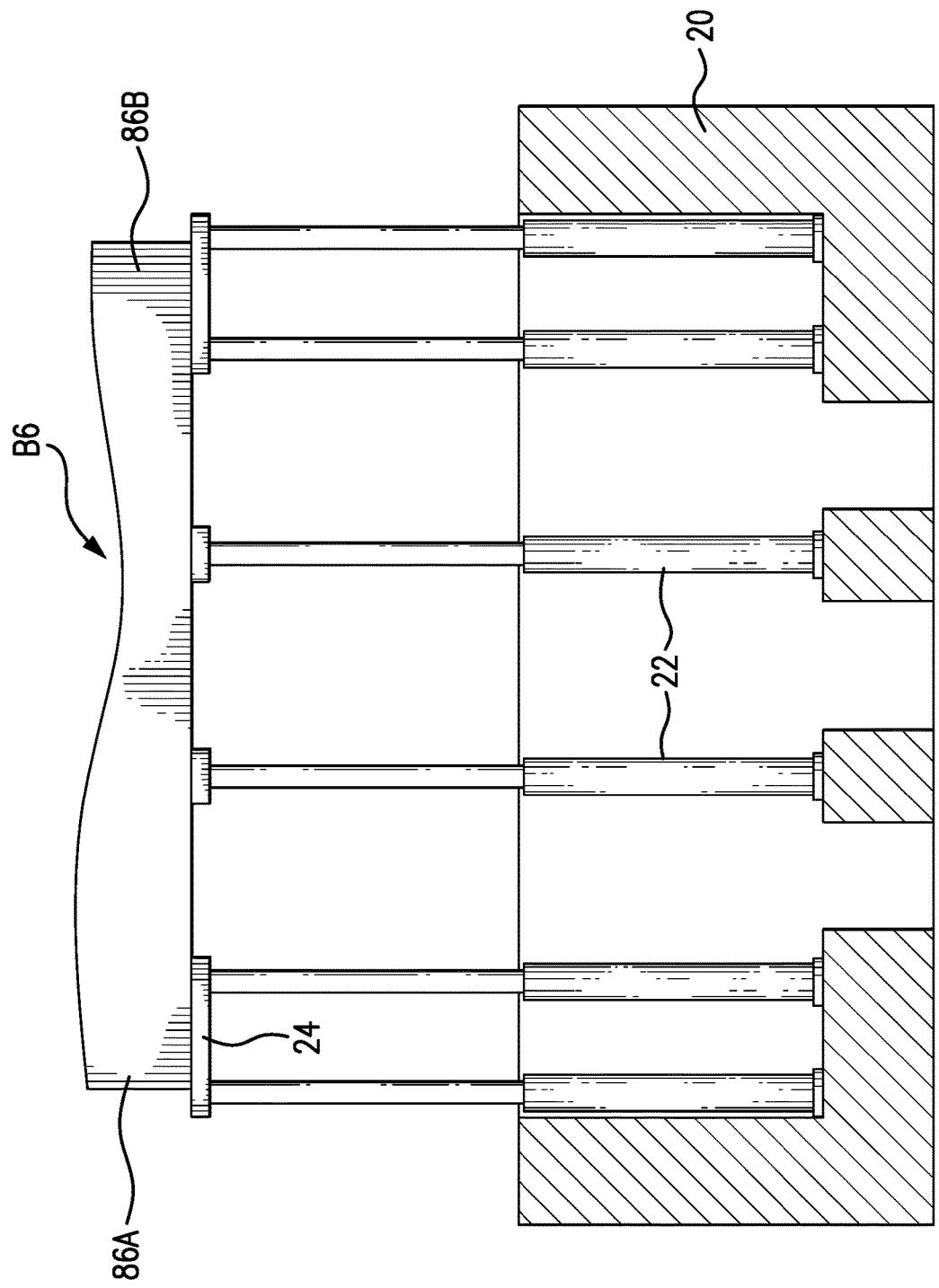
FIG. 4 is a side view of all of the cylinders extended before the insertion of a new level.

The first step of the process is shown in FIG. 4, in which all of hydraulic cylinders 22 are extended to push up tower 80 by the height of one level. In the embodiment shown in FIGS. 1-9, all of the levels 84 and 86 have approximately a same height. However, different heights could be used as long as the extension height of hydraulic cylinders 22 is greater than the tallest level. At this step, the tower must slide past the force bearing devices 48 on the restraining trusses, as noted above.

Figure 5:
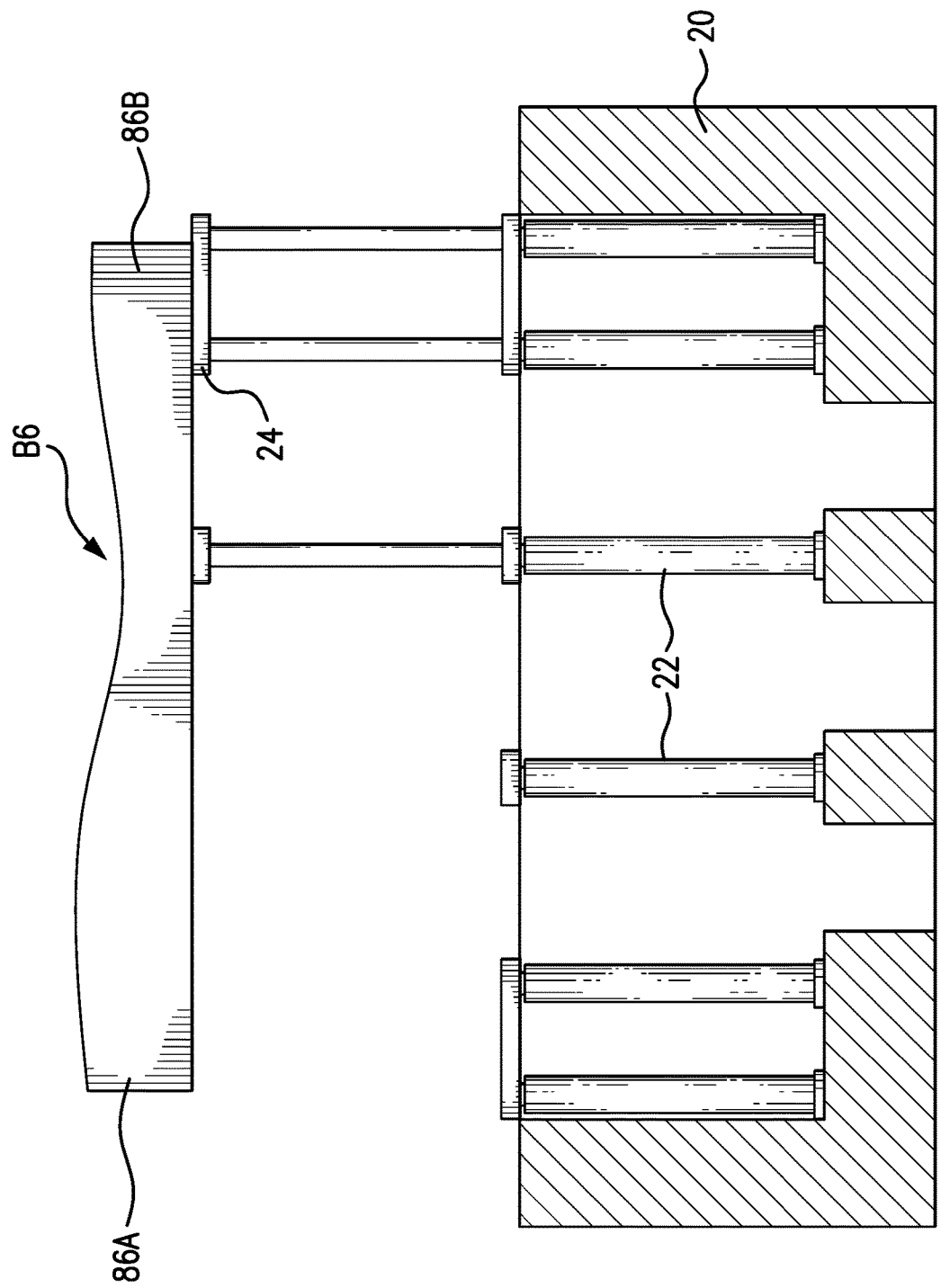
FIG. 5 is a side view showing half of the cylinders retracted and half extended.

As shown in FIG. 5, one half of hydraulic cylinders 22 are then retracted to allow block 86A of new level 86 to be inserted. As noted above, in the embodiment shown in FIGS. 1-9, new level 86 is made of two equal sized blocks 86A and 86B. However, embodiments where three or more blocks are used and/or each block is more or less than half of each level are possible and are within the scope of the present invention.

Block 86A is inserted by the use of a forklift. Block 86A is then connected to the level above. Block 86A may be adhered to the block above, or may have grooves or projections that mate with the block above, or both. During this time, uneven forces are placed on the existing tower 80. Accordingly, restraining trusses 44 and 46 exert horizontal forces on the tower 80 to prevent tower 80 from tipping over due to these uneven forces.

Figure 6:
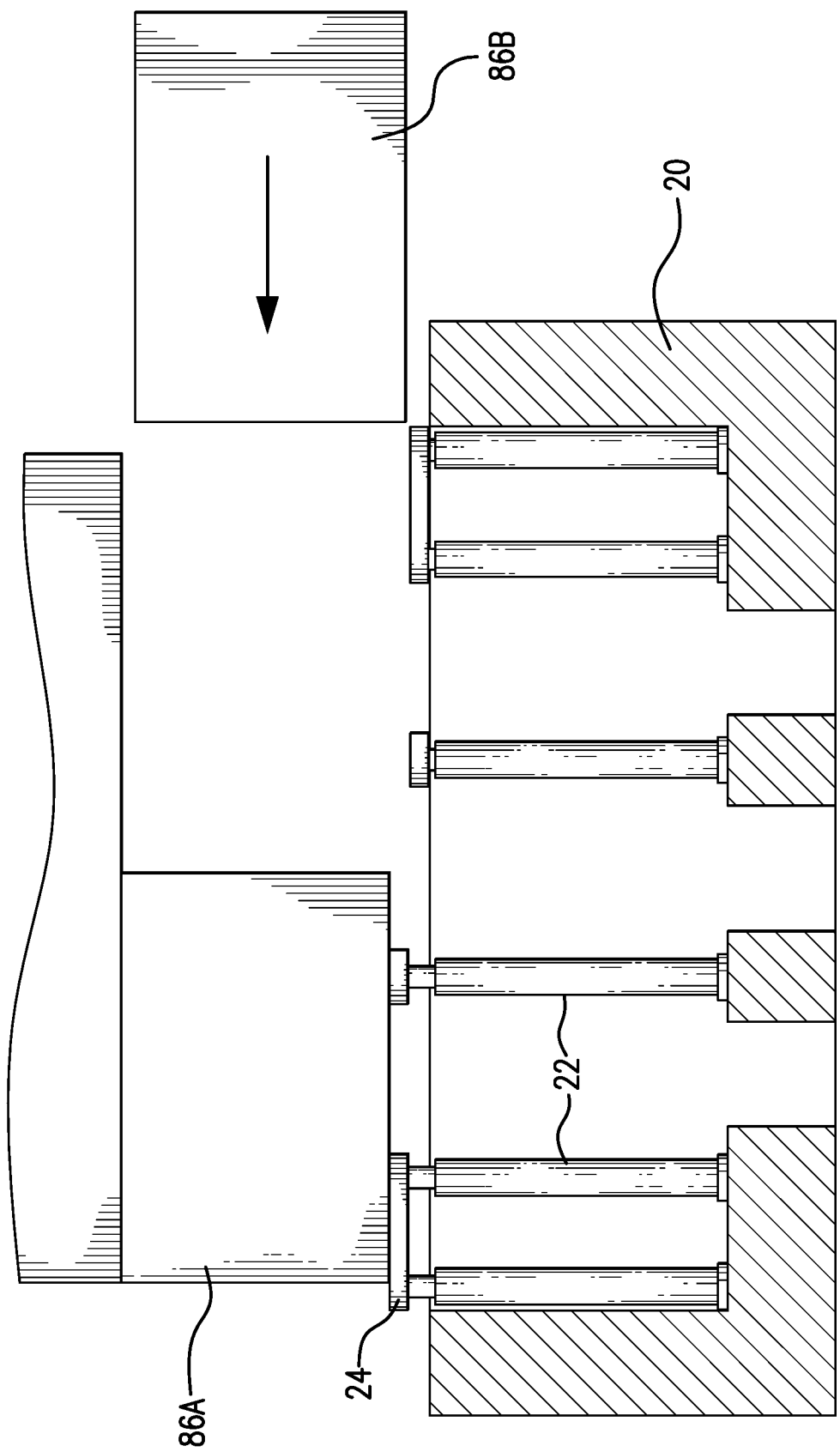
FIG. 6 is a side view of the first block that is fully inserted and the hydraulic cylinders below are extended to contact the block.
Figure 7:
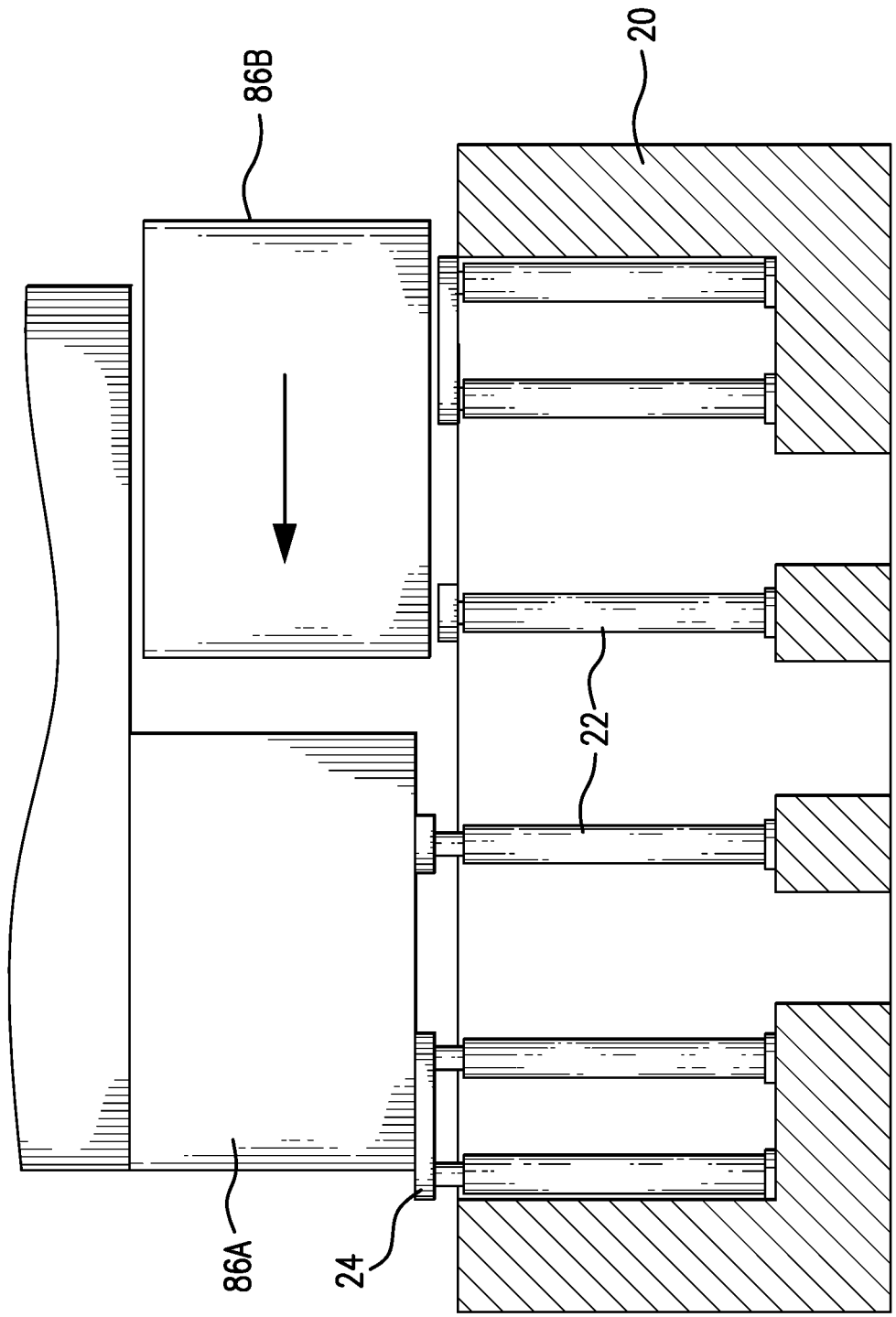
FIG. 7 is a side view of the insertion of the second block.
Figure 8:
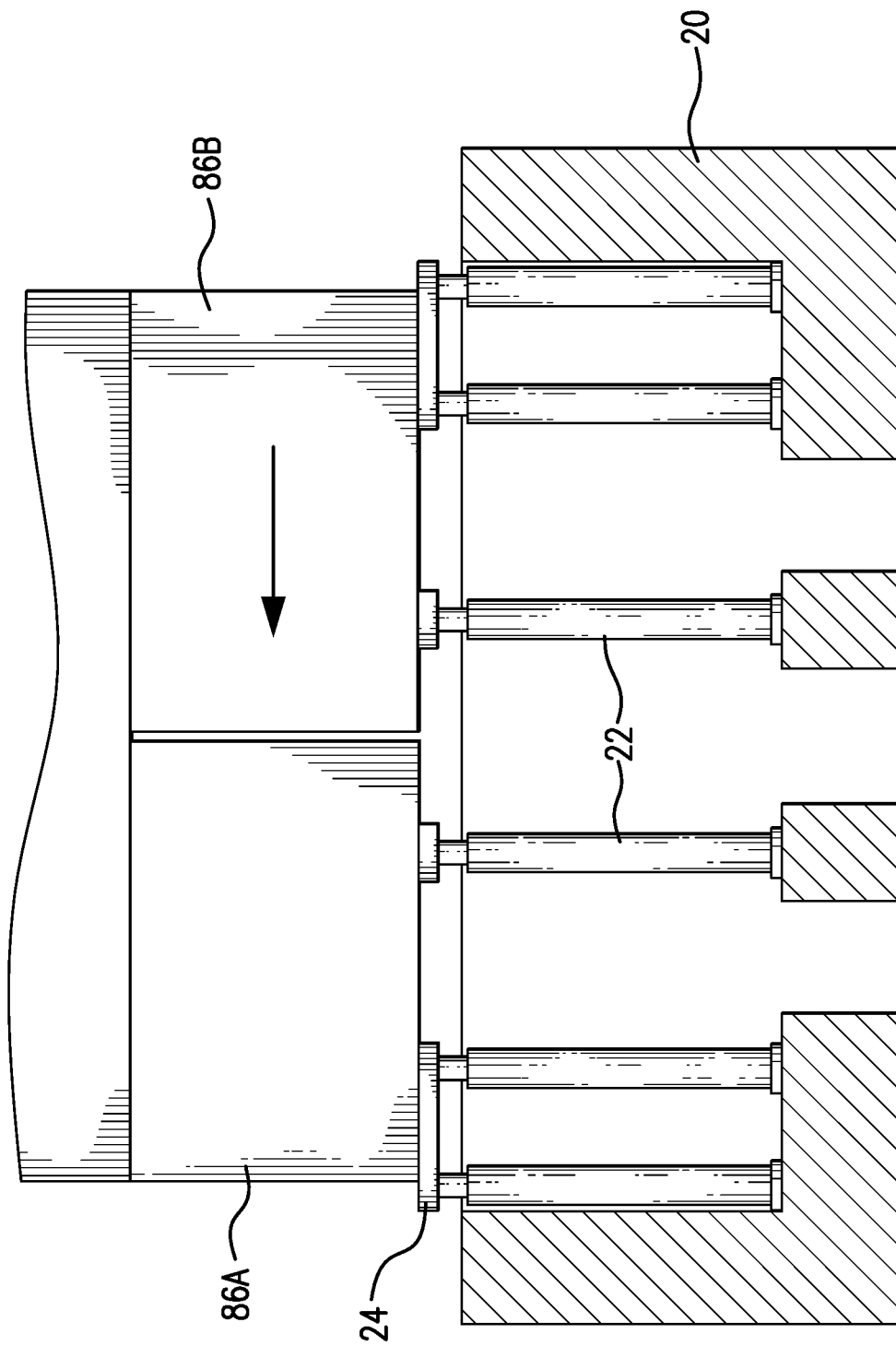
FIG. 8 is a side view of the completion of a level.

At this point, the other half of the hydraulic cylinders 22 are retracted, as shown in FIG. 6. This allows block 86B to be inserted using a forklift, as shown in FIG. 7. Block 86B is then connected to the level above in a similar manner as block 86A, as shown in FIG. 8. This should end the uneven forces on the tower, and reduce the load on the truss tower 40.

Finally, the new level 86 is pushed up the height of a level by extending all of the hydraulic cylinders 22, as shown in FIG. 4. Half of the hydraulic cylinders are then retracted to allow the next level to be added, as described above. However, in the embodiment shown in FIGS. 1-9, the seams between the two blocks are alternated from level to level. That is, the seam between two blocks is only located on a particular face for every other level, as shown in FIG. 1. Thus, for example, a first level 86 is constructed by lowering a front half of hydraulic cylinders 22, adding block 86A to the front opening, lowering the back half of hydraulic cylinders 22, and then adding back block 86B. The following level would be constructed by lowering either the right (or left) half of hydraulic cylinders 22, adding block 86A to the right (or left) opening, lowering the left (or right) half of hydraulic cylinders 22, adding block 86B to the left (or right) opening. This is accomplished using the control computer 60 shown in FIG. 3.

Control computer 60 receives position and pressure readings from each of the cylinders 22 through lines 60A (FIG. 3 does not show all of lines 60A). Control computer 60 then sends signals to control pressurized fluid to each cylinder 22 through line 60C to pressure manifold 62. Based on the signals from the control computer 60, pressure manifold 62 supplies pressurized fluid to each cylinder 22 through a respective valve 62A. (Not all of valves 62A are shown in FIG. 3.) Control computer 60 also controls a return valve on each cylinder 22 through line 60B. (Not all of lines 60B are shown in FIG. 3.) When the return valve is opened by control computer 60, fluid runs through a respective return line 66A to fluid reservoir 66. (Only one of the 24 return lines 66A is shown in FIG. 3). Fluid from fluid reservoir 66 is pressurized by electrical or diesel pump 64 before it is supplied to the pressure manifold 62.

Control computer 60 has several programs to control multiple sets of the cylinders 22. As discussed above, in the embodiment shown in FIGS. 4-8, half of cylinders 22 are controlled to extend and retract together, and the halves are alternated for each level between (1) right and left half and (2) front and back half. Thus, control computer 60 at has programs to extend and retract (1) the right half of cylinders 22, (2) the left half of cylinders 22, (3) the front half of cylinders 22, and (4) the back half of cylinders 22. Additional commands such as all extend and all retract can also be programmed into control computer 60. Further, if each level includes more than 2 blocks, additional commands will be needed to control smaller subsets of cylinders 22.

Accordingly, a tower 80 may be constructed with less use of a crane, or without the use of a crane at all. As a forklift is much cheaper to operate than a crane, a substantial cost savings may be gained by using the present method and apparatus for constructing a tower.

The present written description uses examples to disclose the present subject matter, including the best mode, and also to enable any person skilled in the art to practice the present subject matter, including making and using any devices or systems and performing any incorporated and/or associated methods. While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An apparatus for constructing a tower, the apparatus comprising:
    a foundation including a plurality of hydraulic cylinders;
    a truss tower located on the foundation and configured to support a tower built on the foundation, the tower including a first tower segment and a second tower segment; and
    a controller that controls extension and retraction of the hydraulic cylinders to lift the first tower segment, wherein when extended, the hydraulic cylinders directly exert a vertical force on a bottommost surface of the first tower segment to move the first tower segment relative to the truss tower such that the second tower segment can be disposed below, and abut, the bottommost surface of the first tower segment.

2. The apparatus according to claim 1, wherein the plurality of hydraulic cylinders are arranged in pairs.

3. The apparatus according to claim 1, wherein the truss tower includes at least two restraining trusses arranged around the tower.

4. The apparatus according to claim 3, wherein each restraining truss includes at least one force bearing device that exerts a horizontal force on the tower, wherein the at least one force bearing device includes a roller and a hydraulic cylinder, the roller being configured to exert the horizontal force on the tower while allowing the tower to move vertically past the roller, and the hydraulic cylinder being configured to move the roller to contact the tower.

5. The apparatus according to claim 1, wherein the controller controls the plurality of hydraulic cylinders to all extend together, to retract a subset of the plurality of hydraulic cylinders, and to retract a rest of the plurality of hydraulic cylinders.

6. The apparatus according to claim 1, wherein the controller controls the plurality of hydraulic cylinders to all extend together, to retract one half of the plurality of hydraulic cylinders, and to retract an other half of the plurality of hydraulic cylinders.

7. The apparatus according to claim 1, wherein the plurality of hydraulic cylinders are removable from the foundation after completion of the tower.

8. The apparatus according to claim 1, wherein the tower moves with respect to the truss tower when the plurality of hydraulic cylinders are extended, and the truss tower remains stationary when the plurality of hydraulic cylinders are extended.

9. The apparatus according to claim 1, wherein the tower includes at least one wall and the hydraulic cylinders directly exert a vertical force on a bottommost surface of the wall portion of the tower to move the tower relative to the truss tower.

10. The apparatus according to claim 1, wherein the tower comprises concrete.

* * * * *